United States Patent [19]

Cheng

[11] Patent Number: 4,768,427
[45] Date of Patent: Sep. 6, 1988

[54] COOKING PANS
[75] Inventor: Stanley K. Cheng, Kowloon, Hong Kong
[73] Assignee: Meyer Manufacturing Company Limited, Kowloon, Hong Kong
[21] Appl. No.: 947,940
[22] Filed: Dec. 31, 1986
[30] Foreign Application Priority Data
  Sep. 1, 1986 [GB] United Kingdom ............... 8621120
[51] Int. Cl.$^4$ ............................................. A47J 37/10
[52] U.S. Cl. ...................................... 99/422; 99/445; 126/390
[58] Field of Search ................. 99/422, 445, 372; 126/390; 220/458

[56] References Cited
U.S. PATENT DOCUMENTS

| | | |
|---|---|---|
| 1,063,911 | 6/1913 | Chadwick ........................... 126/390 |
| 1,460,380 | 7/1923 | Hughes ............................ 126/390 X |
| 1,644,255 | 10/1927 | Kercher et al. ................... 99/445 X |
| 2,462,242 | 2/1949 | Webb et al. ....................... 99/422 X |
| 2,618,258 | 11/1952 | Kroyer ............................. 99/422 X |
| 2,765,728 | 10/1956 | Pearce ............................ 126/390 X |
| 3,493,726 | 2/1970 | Bardeau ............................ 99/422 X |
| 4,533,807 | 8/1985 | Miramida ....................... 126/390 X |

Primary Examiner—Louis K. Rimrodt
Assistant Examiner—Judith L. Olds
Attorney, Agent, or Firm—Townsend and Townsend

[57] ABSTRACT

In order to reduce the tendency of foodstuff to adhere to a cooking surface, that surface is provided with an uneven surface formed with closely-spaced peaks or corrugations, normally in the form of concentric grooves. The surface may additionally include a layer of "Non-stick" material which further reduces the likelihood of foodstuffs sticking thereto.

18 Claims, 2 Drawing Sheets

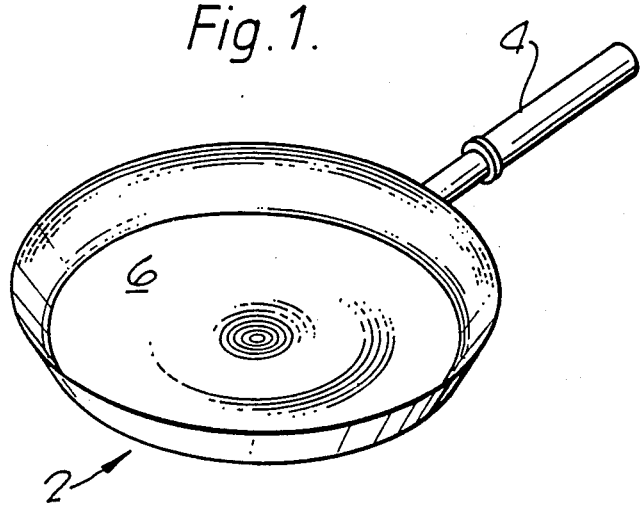
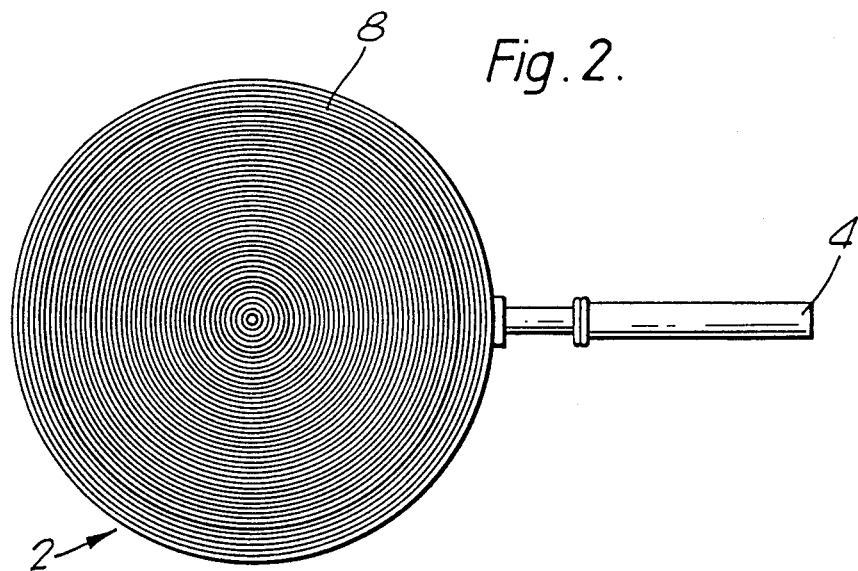

COOKING PANS

BACKGROUND TO THE INVENTION

This invention relates to ovenware, and particularly to cooking pans which are to be used in circumstances where foodstuffs are likely to adhere to one or more surfaces thereon. The invention has an immediately apparent application in pans which are to be heated on a stove, but is also suitable for ovenware.

A continuing problem with cooking utensils of all kinds is that foodstuff will tend to adhere to heated surfaces. This is a particular problem in frying pans and other vessels which are used on a stove, but one which also developes on pans used in oven cooking. In recent years, various attempts have been made to produce surfaces for such pans to which foodstuff will not adhere or will not readily adhere in the cooking process, and the most effective of these has been the provision of "non-stick" surfaces. The most commonly used material for such "non-stick" surface is polytetrafluoroethylene (PTFE).

Cooking utensils, particularly for toasting and grilling, have also been designed with ribbed or uneven surfaces to maintain a piece of food spaced from the body of the utensil. Examples of such utensils are disclosed in U.S. Pat. No. 2,875,683 (Burns); and British Pat. Nos. 372,025 (Bells), 422,378 (Moneta) and 742,484 (Knight). However, support for food in these utensils is often unsatisfactory, and they render the use of cooking implements on the surface rather difficult.

While the provision of "non-stick" surfaces is effective, such surfaces have a limited life. In normal use, it is almost inevitable that they will become scratched, and over a period of time, the surface will be broken, and partially or totally removed.

SUMMARY OF THE INVENTION

According to the present invention, the inner or upper surface of a pan which is to contact foodstuff being cooked is formed with undulations which form closely-spaced peaks which effectively reduce the area of contact respectively between the surface and the item being cooked, and between the surface and any cleaning implement or device. In this way, the degree of adherence of foodstuffs is reduced as a consequence of the reduced area of contact, and during cleaning and/or removal of any foodstuff that has so adhered, contact between any cleaning tool or device is concentrated at the peaks. The troughs or valleys are thus left relatively unscathed, and any surface thereon is substantially preserved. Normally the undulating surface will have closely spaced corrugations.

In preferred embodiments of the invention, the surface is corrugated and covered with a "non-stick" surface, and this provides additional benefits. Firstly, any tendency of foodstuffs to adhere in the troughs of the corrugations is reduced, and the "non-stick" characteristics of the surface in the troughs is better preserved as cleaning tools and devices are unlikely to make contact therewith. Secondly, during cleaning, any scratching that is caused will be substantially restricted to the peaks of the corrugations, reducing the area of surface to which foodstuff is likely to adhere, even as the "non-stick" surface is eroded. Thirdly, as the peaks are worn away by cleaning, the base material is only progressively revealed as initially, only the "non-stick" material on the walls of the corrugations is exposed. If the primary material of the cooking pan base is of a particularly hard resilient material, then this erosion of the corrugations is very slow, and the useful life of cooking pan according to this embodiment of the invention can therefore be considerable.

A preferred primary material for cooking pans according to the invention, particularly frying pans, and with or without a "non-stick" surface, is anodized aluminium. Other materials such as steel, stainless steel or cast iron can though, be used quite satisfactory, as can the use of materials which are surface hardened only, and laminates. Such a laminate might be a steel clad aluminium sandwich base for a pan particularly for use on electric stoves.

The lower surface of pans according to the invention can be selected for the intended use of a pan. A pan for use on an electric stove should normally have a substantially flat base for good conductive contact with an heating element, but for other uses irregular surfaces can be satisfactory.

In order to be effective in achieving the objects of the invention, the spacing of the peaks or corrugations formed in the cooking surface must be relatively close. We have found that a suitable maximum pitch spacing is 2 mm. Normally, the peaks are no more than 1 mm apart, preferably less. Wider spacings can be acceptable where the pan is to be used for frying in oil or fat, as the oil or fat itself will be retained in the troughs between the peaks and thereby reduce the tendency of foodstuff to adhere thereto. This benefit is however enhanced when the spacing is reduced.

Other features and advantages of the invention will be apparent from the following description of embodiments thereof, in which reference will be made to the accompanying drawing:

BRIEF DESCRIPTION OF THE DRAWING

FIG. 1 shows a perspective view of a frying pan embodying the invention;

FIG. 2 shows a plan view of the frying pan of FIG. 1;

DESCRIPTION OF PREFERRED EMBODIMENT

The frying pan shown in FIG. 1 is of conventional overall design and comprises a body 2 and a handle 4. The body has a lower heat receiving surface (not visible in FIG. 1 but shown as 22 in FIG. 3), and an upper cooking surface 6. The upper cooking surface 6 is formed with a pluarity of closely spaced corrugations 8, shown more clearly in FIGS. 2 and 3.

The pan body itself is normally made from a single piece of material, either cast or machined, and can be adapted for use either with open flame stoves (gas) or electric (unit or "smooth-top") cookers where the underside of the pan will be machined flat to ensure good contact with the electric heat source.

The corrugations shown in FIG. 2 are in the form of concentric circles, although any pattern may be adopted. Circular corrugations have the attraction of being easily machined into the surface of the pan and having no sharp bends therein. Straight corrugations can be adopted, particularly in square or rectangular pans.

A pan made of a suitable material and being formed with corrugations according to the invention offers substantial advantages over known flat surfaced pans. These benefits can be enhanced, however, by the application of a "non-stick" material to the corrugated surface. The construction of a pan base according to the invention, and with such a surface, is shown in more detail in FIG. 3.

Figure 3:
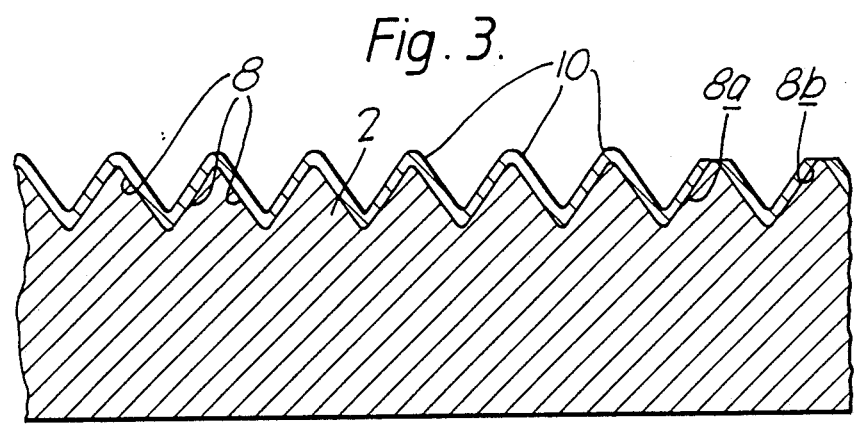
FIG. 3 shows an enlarged cross section of a portion of the frying pan base.

As shown in FIG. 3, the body of the pan is formed with surface corrugations 8. These can be ground or machined into the surface by conventional means, and the sharp corners at the peaks and troughs have been removed. A continuous layer 10 of polytetrafluoroethylene is then applied to the corrugated surface, also in a manner known per se. Again, these sharp corners at the peaks and troughs of the corrugations are removed such that the exposed cooking surface is relatively smooth. Towards the right of the figure, the results of long use and abrasive cleaning is illustrated. As can be seen, the peaks of the two corrugations 8a and 8b have been worn away, but only the peak corrugation 8b is worn away to such an extent that the base metal of the body 2 is exposed. Initial wear increases the exposed area of "non-stick" surface, and even after prolonged wear only a small area of the base material is exposed. Once the base material is exposed, then as this material (e.g. anodized aluminium) is considerably harder and more resilient than the "non-stick" material, the rate of further erosion of the corrugation peaks is reduced. It will be noted that in the valleys of the corrugations, the "non-stick" material will suffer little if any erosion.

Benefits similar to those described above can be achieved by forming a generally rough base surface, rather than one which is specifically corrugated. In this context, "rough" means the creation of distinct spaced peaks and recesses, as against merely a key for the subsequent application of a "non-stick" surface. In a surface roughened in accordance with this aspect of the invention, the peak to valley spacing will be for example, of the order of 1 to 2 mm, normally no more than 1.5 mm, and the exposed "non-stick" surface can be substantially smooth. Once again, the use of cleaning tools will predominantly erode the "non-stick" material, but erosion will be reduced once the peaks of the base material become exposed.

Figure 4:
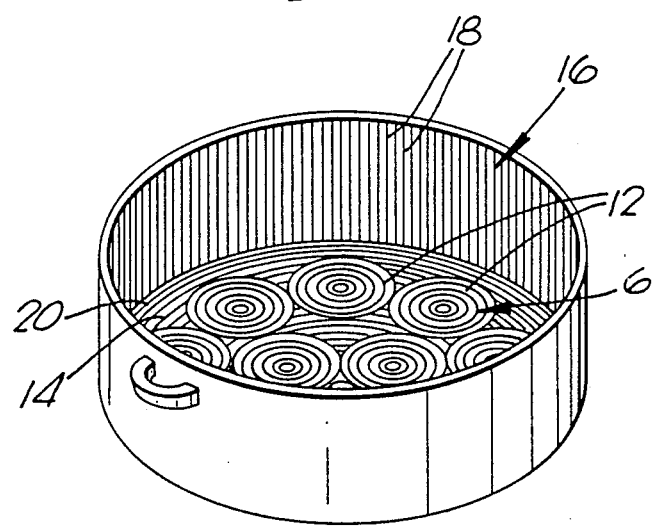
FIG. 4 shows a perspective view of a saucepan or baking pan embodying the invention.

It will be appreciated that the rough or corrugated surface can extend into and up the side wall or side walls of a cooking pan, and this will be a particular benefit in ovenware. While the invention has been particularly described above in connection with a frying pan, it is readily adapted for use in other pans or indeed, any cooking utensil in which adherence of foodstuffs to a surface is a problem. For example, it may also be embodied in griddle pans which are a permanent component of a piece of cooking apparatus. Another example is shown in FIG. 4, where a saucepan or baking pan is provided with a cooking surface 6 having a pattern of corrugations in the form of a plurality of concentric circular grooves 12 superimposed on an overall pattern of grooves 14. The side wall 16 of the pan is formed with straight corrugations 18. Between the corrugations 16 and the grooves 12 and 14 at the junction between the side wall and the cooking surface, a smooth annular area 20 is formed. This region is least subject to contact by cooking implements, and a smooth surface here is sufficient to minimize adherence of foodstuffs thereto. All the inner surfaces may be coated with a non-stick surface to achieve the additional benefits of the invention as described above. The inclusion of a smooth annular region 20 can be incorporated in all embodiments of the invention between the contact surface 6 and a side wall of the pan.

The embodiments of the invention described are by way of example only. Various modifications thereto may be made within the spirit and scope of the invention. Particularly features of one embodiment may be adopted in the other or individually while still benefiting from the invention defined herein.

I claim:

1. A cooking pan comprising a base having an outer heat receiving surface and an inner contact surface for engaging foodstuff to be cooked, the contact surface being formed with corrugations defining closely spaced peaks in a substantially common plane and having a pitch spacing of no more than about 2 mm.

2. A cooking pan according to claim 1 wherein the corrugated surface forms a definable pattern.

3. A cooking pan according to claim 2 wherein the corrugated surface defines concentric circular grooves around the center of the base.

4. A cooking pan according to claim 1 wherein at least a layer forming the contact surface comprises anodized aluminium.

5. A cooking pan according to claim 4 wherein the material of the base between the outer and contact surfaces is anodized aluminum.

6. A cooking pan according to claim 1 where the base is substantially circular and has an upstanding side wall integral therewith, the corrugated contact surface terminating at the junction between the base and side wall.

7. A cooking pan according to claim 1 wherein the base is substantially circular and has an upstanding side wall integral therewith, the corrugated extending onto the side wall.

8. A cooking pan according to claim 1 wherein the undulating surface has a non-stick surface thereon.

9. A cooking pan according to claim 8 wherein the non-stick surface comprises polytetrafluoroethylene (PTFE).

10. A cooking pan comprising a base having an outer heat receiving surface and an inner contact surface for engaging foodstuff to be cooked, the contact surface being formed with concentric annular grooves in a defineable pattern, of which the pitch spacing between the concentric grooves is less than 2 mm, the contact surface being provided with a non-stick surface coating which conforms to the grooved pattern thereon.

11. A cooking pan according to claim 10 wherein the defineable pattern comprises a plurality of groups of concentric grooves superimposed on an overall pattern of grooves.

12. A cooking pan according to claim 10 including a side wall, the inner surface of which is formed with corrugations defining closely spaced peaks substantially in a common plane thereof.

13. A cooking pan according to claim 12 including an annular region between the side wall inner surface and the contact surface, which region is substantially smooth.

14. A frying pan comprising a base and side wall with the base having an outer heat receiving surface and an upper contact surface for engaging foodstuff to be cooked, the contact surface being formed with a pattern of concentric circular grooves with a pitch spacing between the grooves of less than 2 mm and having a non-stick surface coating thereon, the contact surface merging with the side wall, and the grooved pattern with said non-stick surface coating thereon extending up said side wall.

15. A cooking pan comprising a base having an outer heat receiving surface and an inner contact surface for engaging fodstuff to be cooked, the contact surface being formed with corrugations defining closely spaced peaks in a substantially common plane and having a pitch spacing of no more than about 1 mm.

16. A cooking pan comprising a base having an outer heat receiving surface and an inner contact surface for engaging foodstuff to be cooked, the contact surface being formed with corrugations defining closely spaced peaks in a substantially common plane, said base being substantially circular and having an upstanding side wall integral therewith and said corrugated cooking surface extending onto said side wall.

17. A cooking pan according to claim 16 wherein the pitch spacing of the corrugations does not exeed 2 mm.

18. A cooking pan according to claim 16 wherein the pitch spacing of the corrugations does not exceed 1 mm.

* * * * *